(12) United States Patent
Parmar et al.

(10) Patent No.: US 9,509,694 B2
(45) Date of Patent: Nov. 29, 2016

(54) PARALLEL ON-PREMISES AND CLOUD-BASED AUTHENTICATION

(71) Applicant: EMC Corporation, Hopkinton, MA (US)

(72) Inventors: Varun Parmar, San Jose, CA (US); Ondrej Hrebicek, San Carlos, CA (US); Matthew Doermann, Palo Alto, CA (US); Brian W. Levine, Campbell, CA (US); Ashwani Kumar Verma, Pleasanton, CA (US); Alex Kronrod, Campbell, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/144,930

(22) Filed: Dec. 31, 2013

(65) Prior Publication Data

US 2015/0188922 A1 Jul. 2, 2015

(51) Int. Cl.
*H04L 29/06* (2006.01)
*G06F 21/33* (2013.01)

(52) U.S. Cl.
CPC .............. *H04L 63/10* (2013.01); *G06F 21/33* (2013.01); *H04L 63/0807* (2013.01)

(58) Field of Classification Search
CPC ... H04L 63/10; H04L 63/0807; G06F 21/33; G06F 21/62
USPC ........................................................ 726/29
See application file for complete search history.

(56) References Cited

U.S. PATENT DOCUMENTS

| 7,624,433 | B1 | 11/2009 | Clark et al. |
| 2010/0199089 | A1 | 8/2010 | Vysogorets et al. |
| 2010/0293385 | A1 | 11/2010 | Nanda et al. |
| 2013/0225080 | A1* | 8/2013 | Doss et al. ................. 455/41.2 |
| 2013/0347129 | A1 | 12/2013 | Samuelsson et al. |

OTHER PUBLICATIONS

International Search Report and Written Opinion for co-pending PCT Application No. PCT/US2014/071647; mailed on Apr. 1, 2015.

* cited by examiner

*Primary Examiner* — Hadi Armouche
*Assistant Examiner* — Angela Holmes
(74) *Attorney, Agent, or Firm* — Dergosits & Noah LLP; Todd A. Noah

(57) ABSTRACT

A method for parallel authentication comprises receiving a download request from a client computer system to download a document stored in a first storage system. The first storage system is coupled to the client computer system via a network. The first storage system is coupled with a second storage system via the network. The download request includes a first token associated with the first storage system and a second token associated with the second storage system. The first storage system is configured to authenticate the download request based on the first token and the second token. Based on successful authentication, the first storage system is configured to authorize the client computer system to download the document.

20 Claims, 8 Drawing Sheets

PARALLEL ON-PREMISES AND CLOUD-BASED AUTHENTICATION

BACKGROUND

The present invention relates to the field of information technology, including, more particularly, to systems and techniques for authentication.

Sensitive information requires protection against unauthorized access. Traditional protection approaches based on single authentication may be vulnerable to breaches.

DETAILED DESCRIPTION

Some embodiments described herein include systems and methods for parallel on-premises and cloud file access authentication in a virtual private cloud file management system. A system includes an on-premise storage system coupled with an on-premise authentication mechanism and a cloud-based authentication mechanism. A request to access a document stored in the on-premise storage system needs to be authenticated by both the on-premise authentication mechanism and the cloud-based authentication mechanism before access is granted.

For some embodiments, a method for parallel authentication comprises receiving a download request from a client computer system to download a document stored in a first storage system. The first storage system is coupled to the client computer system via a network. The first storage system is coupled with a second storage system via the network. The download request includes a first token associated with the first storage system and a second token associated with the second storage system. The first storage system is configured to authenticate the download request based on the first token and the second token. Based on successful authentication, the first storage system is configured to authorize the client computer system to download the document.

Figure 1:
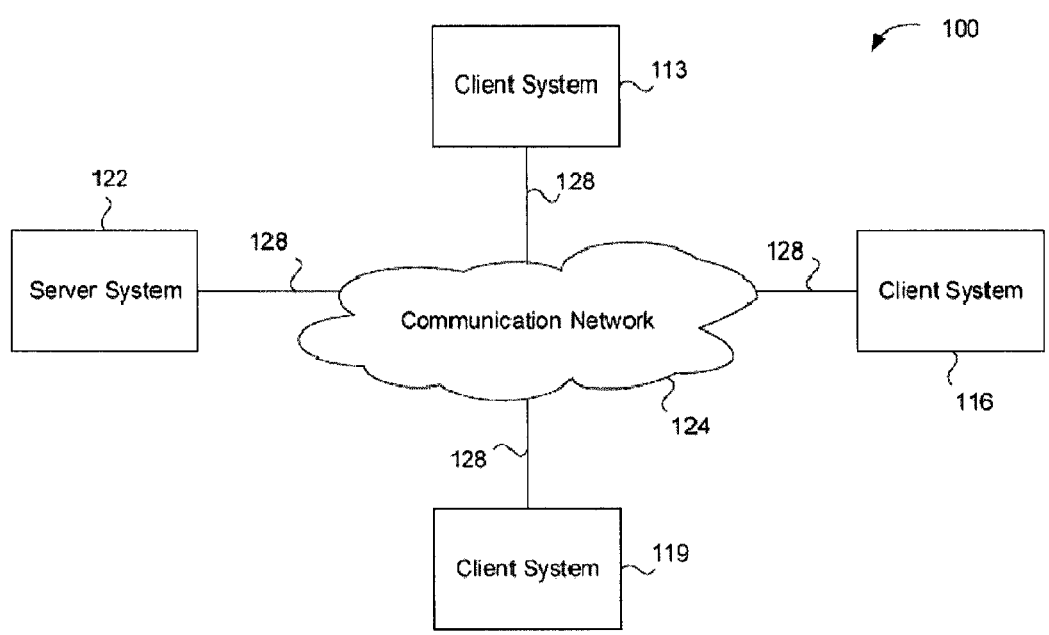
FIG. 1 shows a block diagram of a client-server system and network, implemented in accordance with an exemplary embodiment.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, a simplified block diagram of a distributed computer network 100 is shown. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client and a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
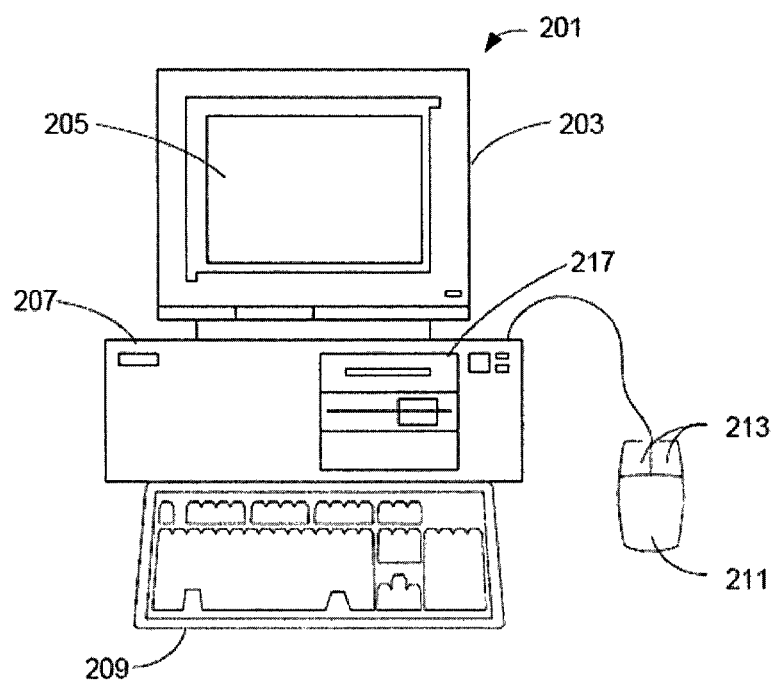
FIG. 2 shows a more detailed diagram of an exemplary client or computer, implemented in accordance with an exemplary embodiment.

FIG. 2 shows an exemplary client or server system that may be utilized in the distributed computer network 100 shown in FIG. 1. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
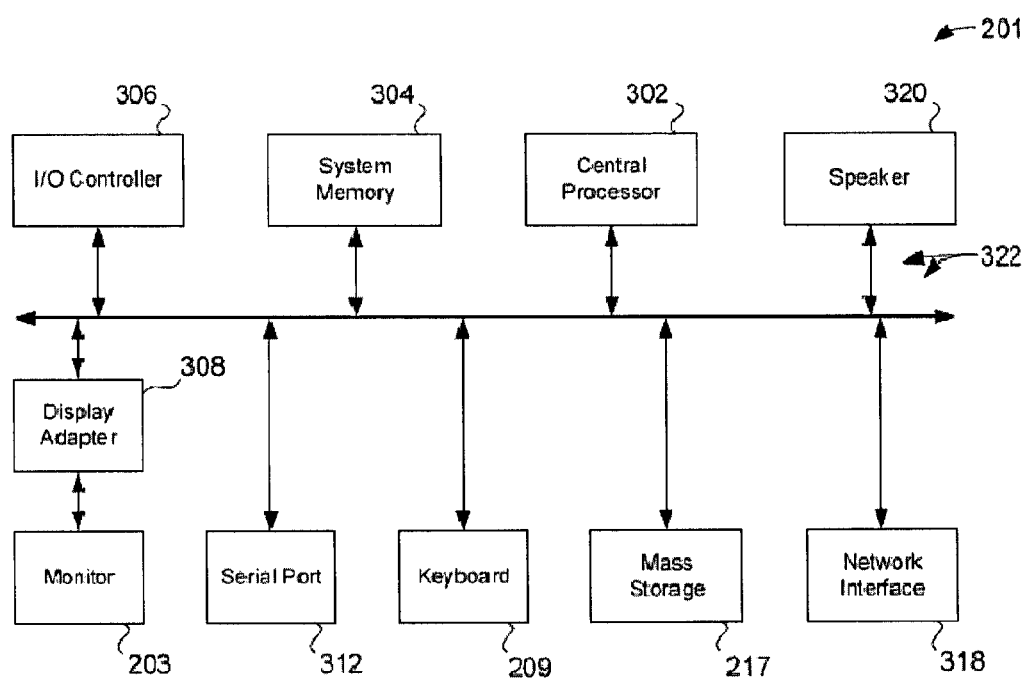
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
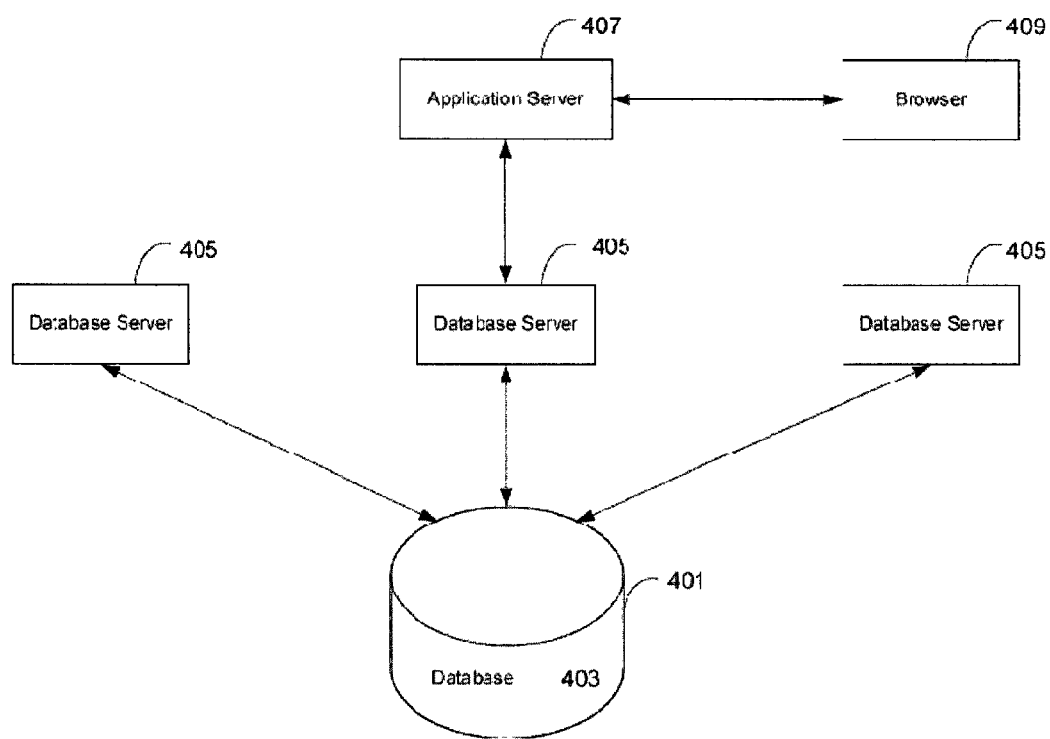
FIG. 4 shows a data source or data service in the form of a database system, implemented in accordance with an exemplary embodiment.

FIG. 4 shows a data source or data service in the form of a database system that may be accessible using a client or server system in the distributed computer network 100 shown in FIGS. 1 through 3. A database may be part of a database management system. One suitable database-management-system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
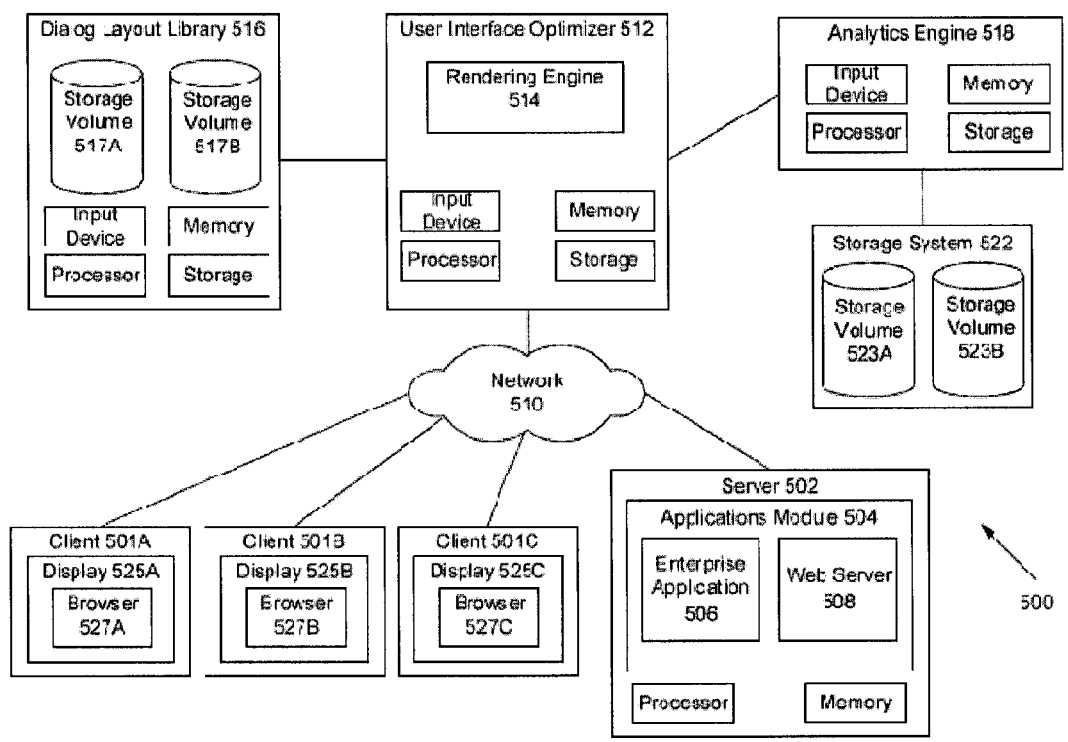
FIG. 5 shows a block diagram of an example of a system 500 for selecting a dialog layout, implemented in accordance with an exemplary embodiment.

FIG. 5 shows a block diagram of an example of a system 500 for selecting a dialog layout, implemented in accordance with some implementations. In various implementations, system 500 may handle a request to optimize a dialog layout of a software application, such as an enterprise application. In some implementations, system 500 may include server 502, applications module 504, enterprise application 506, web server 508, network 510, user interface optimizer 512, rendering engine 514, dialog library 516, storage volume 517A, storage volume 517B, analytics engine 518, storage device 522, storage volume 523A, and storage volume 523B. Moreover, system 500 may include any number of clients such as first, second, and third clients 501A, 501B, and 501C which access server 502 via network 510.

The clients are general purpose computers with hardware and software, such as shown in FIGS. 1 and 3 described above. For example, the first client includes a first display 525A, a first application program (e.g., first browser program) 527A, an input device, a processor, memory, and storage. Similarly, the second client includes a second display 525B, a second application program (e.g., second browser program) 527B, an input device, a processor, memory, and storage. The third client includes a third display 525C, a third application program (e.g., third browser program) 527C, an input device, a processor, memory, and storage.

FIG. 5 shows three clients. It should be appreciated that an enterprise can have any number of clients such as tens, hundreds, or thousands of clients. The clients execute executable code (or computer-readable code) that embodies a technique or algorithm as described in this application. The browser is an application program that can request, receive, and process data from a user, the server, or both. The data can be shown via a display. While FIG. 5 illustrates the data being displayed on a client machine, the data can also be displayed on a mobile device such as a mobile phone, laptop computer or computer tablet.

In various implementations, system 500 may include server 502. The server includes components similar to the components described in FIGS. 1 and 4. In some implementations, server 502 may include hardware and software used to run one or more services to serve the needs of other computers and users on network 510. Thus, server 502 may include one or more processors and memory capable of executing software operations and serving webpages. It will be appreciated that in some implementations, server 502 may comprise several servers in a distributed or cloud computing network.

In various implementations, server 502 may include an applications module, such as applications module 504. In some implementations, applications module 504 includes software and hardware that may be used to execute one or more software applications. Thus, applications module may include software and/or firmware instructions that configure the functionality of server 502.

According to various implementations, applications module 504 includes enterprise application 506. In particular implementations, enterprise application 506 may include software instructions that, when executed by one or more processors, execute one or more processes associated with an enterprise application. Thus, enterprise application 506 may include software instructions that configure one or more tasks performed by a user when the user is performing a process of the enterprise application.

In various implementations, applications module 504 may include an application used to serve webpages, such as web server 508. In some implementations, web server 508 serves web pages to a client machine operated by a user of the enterprise application. Thus, according to various implementations, an application such as a web server 508 may deliver webpages and other content from a storage volume of server 502 to the browsers of the client machines. Thus, according to various implementations, an enterprise application may be accessible to a client machine over the network using the browser. For example, first, second, and third users at client computer systems 501A-501C, respectively, login by using a browser to access the application. The application may require that the user input a username and a password so that the user can be authenticated. The users may be employees, colleagues, partners, or members of the same company, organization, entity, partnership, joint venture, or have a business relationship (e.g., supplier-manufacturer relationship, or client-vendor relationship), and so forth.

In various implementations, system 500 may include user interface (UI) optimizer 512. In some implementations, UI optimizer 512 may be configured to handle requests to optimize a dialog layout for one or more dialogs in a process of an enterprise application. Thus, UI optimizer 512 may communicate with other entities, such as a client machine or server 502, via network 510 and receive a request to optimize a dialog layout. UI optimizer 512 may handle the request by communicating with other components of system 500 that may be coupled to a network, such as analytics engine 518 and dialog layout library 516. UI optimizer may return a result or response to the request via network 510.

In various implementations, UI optimizer 512 may include a rendering engine, such as rendering engine 514. In various implementations, rendering engine 514 may be configured to render a data object into a rendered data object capable of being displayed in a display device of a client machine. For example, rendering engine 514 may render an intermediate data structure into hypertext markup language (HTML) capable of being displayed by an web browser. Thus, according to various implementations, rendering engine 514 may be configured to render a dialog layout into a dialog that may be displayed in a web browser of a client machine, mobile phone, laptop computer or computer tablet.

In various implementations, system 500 may include dialog layout library 516. In some implementations, dialog layout library 516 may include one or more storage volumes, such as storage volume 517A and 517B. In particular implementations, dialog layout library 516 may be configured to store information associated with various dialog layouts, such as content that may be displayed in the dialog layouts. For example, dialog layout library 516 may store one or more data values identifying the content of a text box or the appearance and function of a control. Thus, dialog layout library 516 may provide a repository for information and content associated with various different dialog layouts that may be used at various different stages of the methods described herein.

In various implementations, system 500 may include analytics engine 518. In some implementations, analytics engine 518 may be configured to dynamically analyze responses from users of the enterprise application and select one or more dialog layouts to be provided to the users. Thus, analytics engine 518 may be configured to track input received from users and other components of system 500, and may be further configured to make one or more decisions based on that tracked information.

In various implementations, analytics engine 518 may be configured to store data and metadata related to decisions that have been made, and data that was used to make them. Thus, according to some implementations, system 500 may include storage system 522, where storage system 522 may be coupled to analytics engine 518. In various implementations, storage system 522 may include one or more storage volumes, such as storage volume 523A and storage volume 523B. In particular implementations, storage system 522 may store information generated by analytics engine 518 and used by analytics engine 518. Thus, one or more data values identifying decisions made by and metrics measured by analytics engine 518 may be stored in storage system 522.

Figure 6:
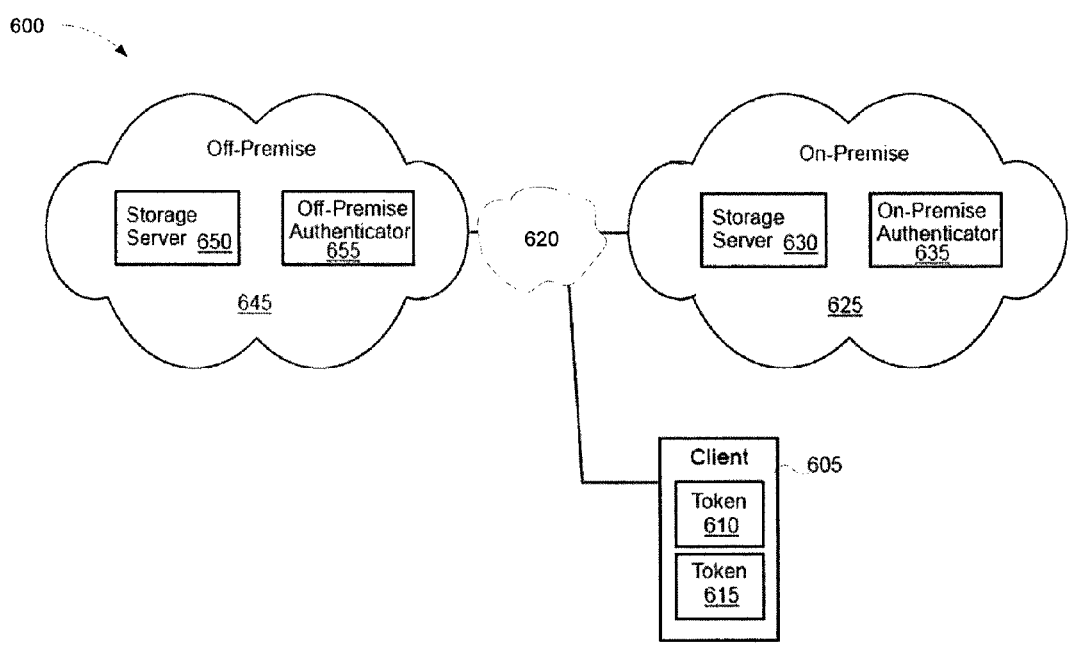
FIG. 6 shows a block diagram that illustrates an example system that may be used to enable parallel authentication, in accordance with an exemplary embodiment.

FIG. 6 shows a block diagram that illustrates an example system utilizing software and hardware components similar to the components described in FIGS. 1 through 5 that may be used to enable parallel authentication, in accordance with an exemplary embodiment. Diagram 600 includes a client computer system 605 coupled to an off-premise storage system 650 via a network 620. The off-premise storage system 650 may be associated with an off-premise authenticator 655. The off-premise storage system 650 may be configured to store information associated with a corporation. The off-premise authenticator 655 may be configured to authenticate requests to access information stored in the off-premise storage system 650. For some embodiments, the off-premise storage system 650 and the off-premise authenticator 655 may be associated with a cloud-based network 645 managed by a cloud computing service provider on behalf of the corporation. The cloud-based network 645 may be a private cloud managed on behalf of the corporation. A user or employee of the corporation may use the client computer system 605 to send requests to access the information stored in the off-premise storage system 650. When requesting to access the information stored in the off-premise storage system 650, the request may include an off-premise token 610 which may be used by the off-premise authenticator 655 to authenticate the request and to authorize access. Traditionally, the off-premise storage system 650 may be configured to store sensitive as well as non-sensitive information associated with the corporation. This may pose potential unauthorized access to the sensitive information because the information may be accessed by non-employees, outside contractors or even disgruntled employees.

For some embodiments, the sensitive information may be stored in the on-premise storage system 630 coupled to the network 620. The on-premise storage system 630 may be associated with an on-premise authenticator 635 configured to authenticate requests to access the information stored in the on-premise storage system 630. For some embodiments, the on-premise storage system 630 and the on-premise authenticator 635 may be connected to an intranet or on-premise network 625. For example, the on-premise storage system 630 may be located and managed locally at a data center of the corporation.

For some embodiments, a request from the client computer system 605 to access information stored in the on-premise storage system 630 may include the on-premise token 615 and the off-premise token 610. The on-premise token 615 and the off-premise token 610 may be included in an HTTP (Hyper Text Transfer Protocol) header that forms the request to access the information stored in the on-premise storage system 630. The on-premise and off-premise tokens 615 and 610 may also be referred to as access tokens. Depending on how the client computer system 605 is used, the on-premise and off-premise tokens 615 and 610 may be user access tokens or application access tokens. These access tokens 610 and 615 may be obtained from the on-premised storage system 625 and the off-premised storage system 635 to provide secure access to the on-premised and off-premised storage systems 625 and 635.

For some embodiments, in order to provide better protection to the sensitive information, all requests to access the sensitive information stored in the on-premise storage system 630 requires both the on-premise token 615 and the off-premise token 610. When the request is received by the on-premise storage system 630, the off-premise token 610 and the on-premise token 615 may be extracted from the HTTP header of the request and sent to the respective off-premise authenticator 655 and on-premise authenticator 635 for both authentications. For some embodiments, the authentication of the request may be performed in parallel by both the off-premise authenticator 655 and the on-premise authenticator 635, and the access to the information is granted only if both authentications are successful. For some embodiments, the parallel authentication approach may also be applied when there is a request to access an encrypted document. For example, the on-premise storage system 630 may send the on-premise token 615 to the on-premise authenticator 655 using Security Assertion Markup Language (SAML). SAML is an XML-based open standard data format for exchanging authentication and authorization data between parties. Alternatively, the on-premise storage system 630 may use Lightweight Directory Access Protocol (LDAP) or other approaches to communicate with the on-premise authenticator 635. The parallel authentication approach may reduce the risk of unauthorized access to the sensitive information in case either of the on-premise authentication or the off-premise authentication is compromised.

Figure 7:
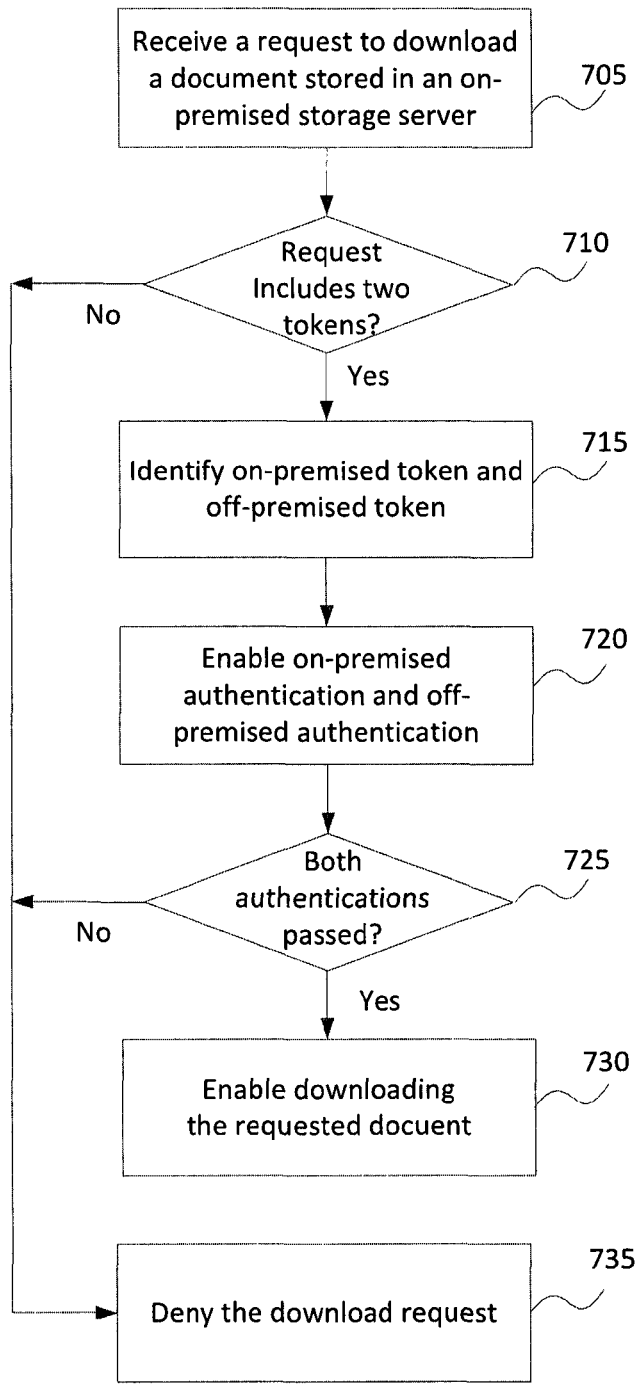
FIG. 7 shows a flow diagram that illustrates an example process that may be performed to authenticate requests for information, in accordance with an exemplary embodiment.

FIG. 7 shows a flow diagram that illustrates an example process that may be performed to authenticate requests for information, in accordance with an exemplary embodiment. The operations may be performed by an on-premise storage system such as the storage system 630 shown in FIG. 6. The process may start at block 705 when a download request or access request for a document stored in an on-premised storage system is received. The on-premised storage system may be configured to store sensitive information, and therefore additional security protection is required to prevent unauthorized access. This may include performing on-premised authentication and off-premised authentication. This may be implemented by requiring all download requests associated with the on-premised storage system to include two tokens, such as the tokens 610 and 615 shown in FIG. 6. The two tokens may be sent together with the download request.

At block 710, a test is performed to determine whether the download request includes the necessary tokens. If the download request includes no token or only one token, the download request is denied, as shown in block 735. From block 710, based on the download request including the two tokens, the process continues to block 715 where the two tokens are identified to determine a token to be used for the on-premised authentication and a token to be used for off-premised authentication. At block 720, the on-premised storage system is configured to cause the on-premised authentication and the off-premised authentication to be performed using the two tokens. This may include sending the on-premised token to the on-premised authenticator and the off-premised token to the off-premised authenticator. The two authentications may be performed in parallel.

At block 725, a test is performed to determine if both the on-premised and off-premised authentication have been successfully completed. Successful completion may mean that the download request is verified to be legitimate and from an authorized user or authorized client computer system. If there is successful completion, the process may continue to block 730 where the download request is authorized and the downloading operation may begin. From block 725, if it is determined that the authentication fails with either or both of the on-premised and off-premised authenticators, the borrow request may be denied, as shown in block 735.

Figure 8:
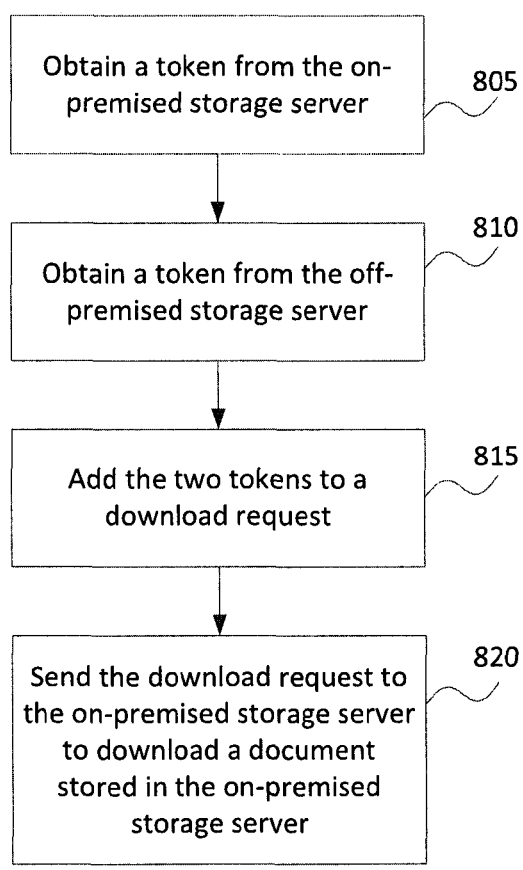
FIG. 8 shows a flow diagram that illustrates an example process that may be performed by a client computer system to access a sensitive document stored in an on-premised storage system, in accordance with an exemplary embodiment.

FIG. 8 shows a flow diagram that illustrates an example process that may be performed by a client computer system to access a sensitive document stored in an on-premised storage system, in accordance with an exemplary embodiment. The operations may be performed by the client computer system 605 shown in FIG. 6. The process may start at block 805 when the client computer system obtains an access token from the on-premised storage system. At block 810, the client computer system obtains an access token from the off-premised storage system. At block 815, the two tokens may be added to a download request. For example, they may be embedded in an HTTP header. At block 820, the download request is sent from the client computer system to the on-premised storage system. The on-premised storage system may then send the on-premised token to the on-premised authenticator and the off-premised token to the off-premised authenticator for authentication.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A computer-implemented method, comprising:
receiving a download request from a client computer system to download a document stored in a first on premised storage server coupled to the client computer system via a network, the first storage server coupled with a second cloud-based storage server via the network, the download request including a first token associated with the first storage server and a second token associated with the second storage server;
causing the download request to be authenticated based on the first token and the second token, wherein the authentication of the download request is based on authenticating the first token in parallel with authenticating the second token; and
authorizing the client computer system to download the document based on successful authentication.

2. The method of claim 1, wherein causing the download request to be authenticated based on the first token and the second token comprises sending the second token to the second storage server.

3. The method of claim 2, wherein the download request is authenticated by a first authenticator associated with the first storage server using the first token.

4. The method of claim 3, wherein the download request is authenticated by a second authenticator associated with the second storage server using the second token.

5. The method of claim 1, wherein the first token and the second token are embedded in a Hyper Text Transport Protocol (HTTP) header of the download request.

6. The method of claim 5, wherein the document is encrypted.

7. A system, comprising:
one or more processors; and
a non-transitory computer readable medium storing a plurality of instructions, which when executed, cause the one or more processors to:
receive a download request from a client computer system to download a document stored in a first on premised storage server coupled to the client computer system via a network, the first storage server coupled with a second cloud-based storage server via the network, the download request including a first token associated with the first storage server and a second token associated with the second storage server;

cause the download request to be authenticated based on the first token and the second token, wherein the authentication of the download request is based on authenticating the first token in parallel with authenticating the second token; and authorize the client computer to download the document based upon the successful authentication.

8. The system of claim 7, wherein the first storage server is configured to identify a first token and a second token from the download request and to cause the authentication of the download request by a first authenticator using the first token and by a second authenticator using the second token.

9. The system of claim 8, wherein the first token is issued by the first storage server and the second token is issued by the second storage server prior to the first storage server receiving the download request from the client computer system.

10. The system of claim 7, wherein the document is encrypted.

11. The system of claim 10, wherein the first token and the second token are embedded in a Hyper Text Transport Protocol (HTTP) header of the download request.

12. A computer program product, comprising a non-transitory computer-readable medium having a computer-readable program code embodied therein, the computer-readable program code adapted to be executed by one or more processors to:

receive a download request from a client computer system to download a document stored in a first on premised storage server coupled to the client computer system via a network, the first storage server coupled with a second cloud-based storage server via the network, the download request including a first token associated with the first storage server and a second token associated with the second storage server;

cause the download request to be authenticated based on the first token and the second token, the authenticating the download of the document stored in the first storage server being based on authenticating the first token at the first storage server in parallel with authenticating the second token at the second storage server; and authorize the client computer system to download the document based on successful authentication.

13. The non-transitory computer-readable medium of claim 12, wherein causing the download request to be authenticated based on the first token and the second token comprises sending the second token to the second storage server.

14. The non-transitory computer-readable medium of claim 13, wherein the download request is authenticated by a first authenticator associated with the first storage server using the first token.

15. The non-transitory computer-readable medium of claim 14, wherein the download request is authenticated by a second authenticator associated with the second storage server using the second token.

16. The method of claim 1, wherein the first storage server is configured to identify a first token and a second token from the download request and to cause the authentication of the download request by a first authenticator using the first token and by a second authenticator using the second token.

17. The method of claim 16, wherein the first token is issued by the first storage server and the second token is issued by the second storage server prior to the first storage server receiving the download request from the client computer system.

18. The non-transitory computer-readable medium of claim 12, wherein the first storage server is configured to identify a first token and a second token from the download request and to cause the authentication of the download request by a first authenticator using the first token and by a second authenticator using the second token.

19. The non-transitory computer-readable medium of claim 18, wherein the first token is issued by the first storage server and the second token is issued by the second storage server prior to the first storage server receiving the download request from the client computer system.

20. The non-transitory computer-readable medium of claim 12, wherein the first token and the second token are embedded in a Hyper Text Transport Protocol (HTTP) header of the download request.

* * * * *